United States Patent
Furukawa et al.

(12) 
(10) Patent No.: US 6,547,616 B1
(45) Date of Patent: Apr. 15, 2003

(54) DISPLAY, ITS MANUFACTURE, INK COATING APPARATUS, ALL SUITABLE FOR NARROWING DISPLAY FRAME

(75) Inventors: Noriaki Furukawa, Kawasaki (JP); Taiji Yuhara, Yonago (JP); Toshiro Katsube, Yonago (JP); Satoru Imai, Kawasaki (JP); Tsukasa Adachi, Kasugai (JP)

(73) Assignee: Fujitsu Display Technologies Corporation, Kawasaki (JP)

( * ) Notice: Subject to any disclaimer, the term of this patent is extended or adjusted under 35 U.S.C. 154(b) by 0 days.

(21) Appl. No.: 09/170,764

(22) Filed: Oct. 13, 1998

(30) Foreign Application Priority Data

Apr. 15, 1998 (JP) .............................. 10-105071
Jul. 6, 1998 (JP) .............................. 10-190675

(51) Int. Cl.⁷ .............................. H01J 9/38; H01J 9/00; H01J 9/24
(52) U.S. Cl. .............................. 445/24; 445/50; 445/58; 445/14; 445/9; 445/10
(58) Field of Search .............................. 445/24, 50, 58, 445/9–14; 313/506; 349/161, 152, 154, 52, 54, 58; 347/38, 39

(56) References Cited

U.S. PATENT DOCUMENTS

| | | | | |
|---|---|---|---|---|
| 4,297,004 A | * | 10/1981 | Nishimura et al. | 350/336 |
| 4,382,263 A | * | 5/1983 | Fischbeck et al. | 346/1.1 |
| 4,389,652 A | * | 6/1983 | Fischbeck | 346/1.1 |
| 4,395,720 A | * | 7/1983 | Grover et al. | 346/140 R |
| 4,509,058 A | * | 4/1985 | Fischbeck | 346/1.1 |
| 4,905,024 A | * | 2/1990 | Nishikawa et al. | 346/140 |
| 5,275,646 A | * | 1/1994 | Marshall et al. | 106/20 B |
| 5,477,357 A | * | 12/1995 | Suzuki et al. | 359/67 |
| 5,659,379 A | * | 8/1997 | Morimoto | 349/149 |
| 5,693,127 A | * | 12/1997 | Nigam et al. | 106/20 R |
| 5,818,564 A | * | 10/1998 | Gray et al. | 349/161 |
| 5,875,011 A | * | 2/1999 | Pierson et al. | 349/73 |

FOREIGN PATENT DOCUMENTS

| | | | | |
|---|---|---|---|---|
| JP | 1009424 A | | 1/1989 | |
| JP | 2569548 | | 10/1996 | |
| JP | 095730 | | 1/1997 | |
| JP | 9146084 | | 6/1997 | |
| JP | 409323434 | * | 12/1997 | B41J/2/21 |
| JP | 2002221714 A | * | 8/2002 | G02F/1/1335 |

* cited by examiner

Primary Examiner—Nimeshkumar D. Patel
Assistant Examiner—Mariceli Santiago
(74) Attorney, Agent, or Firm—Greer, Burns & Crain, Ltd.

(57) ABSTRACT

An image display panel is prepared which has in an in-plane thereof an image display area for displaying an image and a framing area surrounding the image display area. Light shielding ink is supplied from an ink supply source to at least a partial surface area of the framing area of the image display panel. In this case, the ink supply source is made not in contact with the image display panel. Even if the frame structure of an image display device such as a liquid crystal display is made narrow, the image quality in a peripheral area of the image display area becomes hard to be lowered.

20 Claims, 8 Drawing Sheets

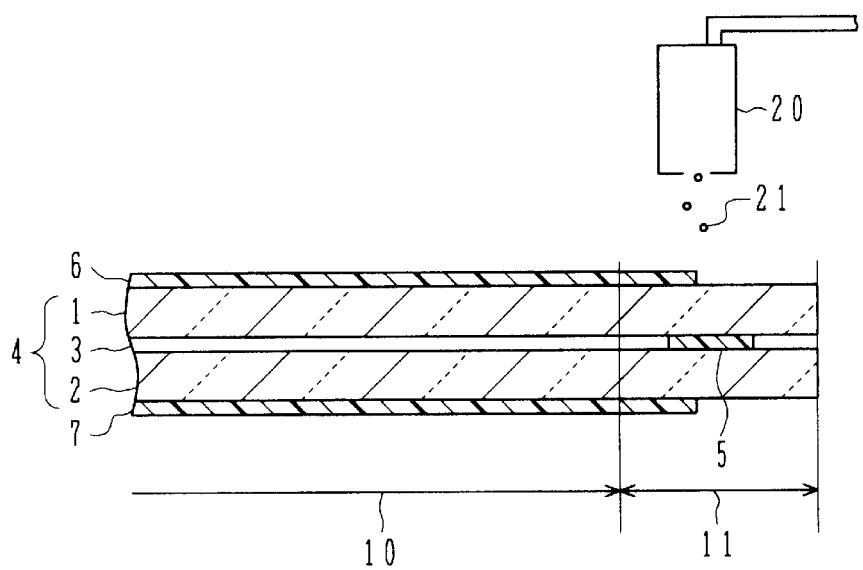
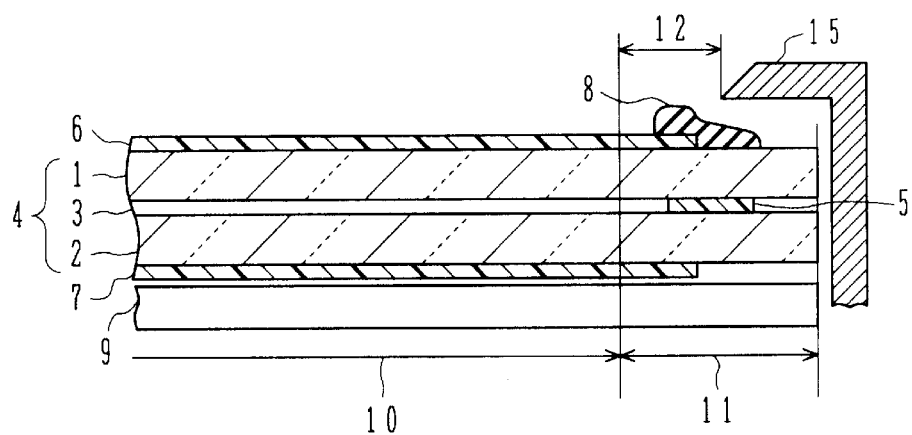
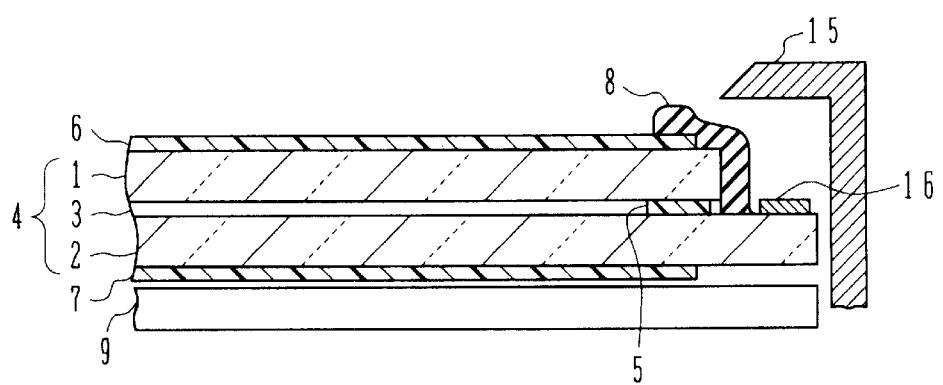

DISPLAY, ITS MANUFACTURE, INK COATING APPARATUS, ALL SUITABLE FOR NARROWING DISPLAY FRAME

This application is based on Japanese Patent Applications No. 10-105071 filed on Apr. 15, 1998 and No. 10-190675 filed on Jul. 6, 1998, the entire contents of which are incorporated herein by reference.

BACKGROUND OF THE INVENTION a) Field of the Invention

The present invention relates to a display, its manufacture, and apparatus used for the manufacture. More particularly, the invention relates to a display, its manufacture, and apparatus used for the manufacture, all suitable for broadening an area of a display screen.

b) Description of the Related Art

Color thin film transistor (TFT) liquid crystal displays of 10 to 11 inches have been mainly used heretofore for portable personal computers. Now, liquid crystal displays of 12 to 13 inches are being adopted to satisfy user's needs for broadening a display screen area and high resolution. To increase the overall size of a personal computer with a broadened display screen area is contradictory with such user's requirements. In order to suppress the overall size of a portable personal computer from becoming bulky, it is necessary to make compact a frame structure of the computer.

However, according to the evaluation of the present inventors, it has been found that the image quality displayed on a peripheral area of the display screen is lowered if the frame structure is made compact.

SUMMARY OF THE INVENTION

It is an object of the present invention to provide a display and its manufacture method capable of suppressing the image quality displayed on a peripheral area of the display screen from being lowered even if the frame structure is made compact.

It is another object of the present invention to provide an apparatus suitable for the manufacture of such a display.

According to one aspect of the present invention, there is provided a method of manufacturing an image display device, comprising the steps of: preparing an image display panel having in an in-plane thereof an image display area for displaying an image and a framing area surrounding the image display area; and supplying light shielding ink from an ink supply source to at least a partial surface area of the framing area of the image display panel, the light shielding ink being coated on the partial surface area without making the ink supply source come in contact with the image display panel.

Since the ink supply source does not contact the image display panel, it is possible to prevent generation of dust. The coated light shielding ink intercepts leak light from an area near the side edges of the image display panel and the image quality to be lowered by leak light can be prevented.

According to another aspect of the present invention, there is provided an ink coating apparatus comprising: a holding stage for holding a substrate; an ink head for jetting out fine ink droplets; and a guide mechanism for translating the ink head along a first direction parallel to a surface of the substrate, while the ink head is faced against the substrate held by the holding stage.

Without making the ink head come in contact with the substrate, fine ink droplets can be jetted out.

According to another aspect of the present invention, there is provided an ink coating method comprising the steps of: preparing an object whose surface is coated with ink, the object having a step in an area where the ink is coated; covering a surface of the object with a mask member, the surface being a peripheral area of the area where the ink is coated; and flying fine droplets of the ink while a flying direction is controlled and supplying the fine droplets to the surface of the object in the area where the ink is coated.

As fine droplets of ink collide with a step, it may be broken and scattered. However, since the nearby area of the area where the ink is coated is covered with the mask member, the broken and scattered ink can be prevented from attaching to areas other than the area where the ink is to be coated.

According to another aspect of the present invention, there is provided an image display device comprising: an image display panel having in an in-plane thereof an image display area for displaying an image and a framing area surrounding the image display area, the image display panel including a first substrate and a second substrate disposed in parallel and spaced by a certain distance, and as viewed along a direction normal to a surface of the substrate, a side edge of the first substrate being flush with a side edge of the second substrate, and another side edge of the first substrate being inside of another side edge of the second substrate; and a light shielding film formed on side edge surfaces of the first and second substrates of the image display panel, the side edge surfaces being located at the flush side edges of the first and second substrates.

According to another aspect of the present invention, there is provided an image display device comprising: an image display panel having in an in-plane thereof an image display area for displaying an image and a framing area surrounding the image display area, the image display panel including a first substrate and a second substrate disposed in parallel and spaced by a certain distance, at least a partial area of the side edge surfaces of the image display panel having matt finished surfaces.

Since the side edge surface is formed with the light shielding film or a matt finished surface, stray light in a space on the bottom side of the image display panel can be prevented from transmitting through the side edge surfaces and leaking to the front side of the image display panel.

BRIEF DESCRIPTION OF THE DRAWINGS

FIGS. 1A to 1C are cross sectional views of a liquid crystal display illustrating a manufacture method thereof according to an embodiment of the invention.

DETAILED DESCRIPTION OF THE PREFERRED EMBODIMENTS

Prior to describing embodiments of the invention, the factors of lowering an image quality of a liquid crystal display with a compact frame structure will be described. The present inventors have elucidated these factors.

Figure 8:
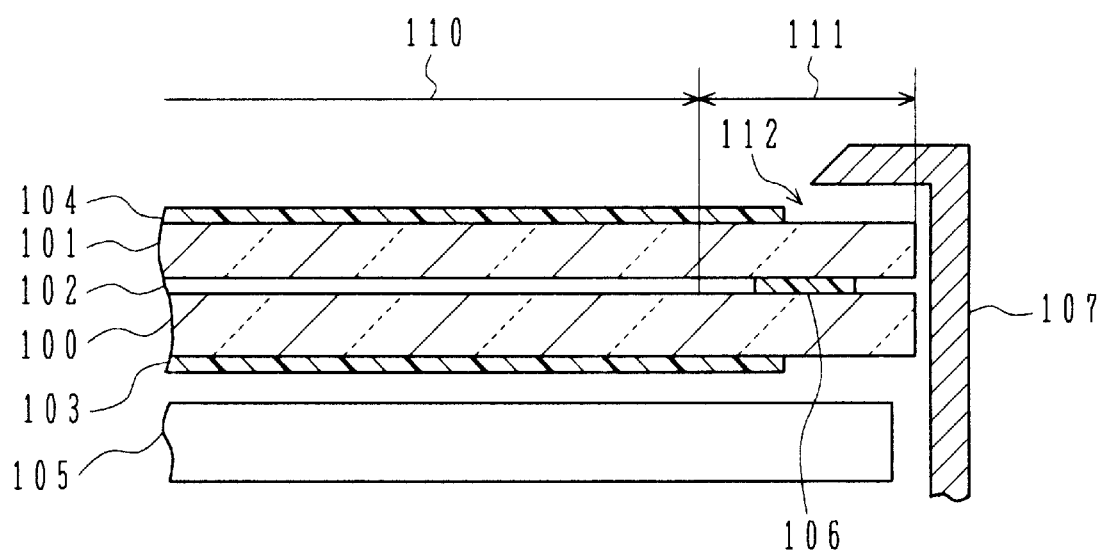
FIG. 8 is a cross sectional view of a conventional liquid crystal display.

FIG. 8 is a cross sectional view showing a peripheral area of a frame structure of a conventional liquid crystal display. A thin film transistor (TFT) substrate 100 and a color filter (CF) substrate 101 are disposed, with TFTs and pixel electrodes on the TFT substrate 100 being faced with color filters and common electrodes on the CF substrate 101. A liquid crystal layer 102 is sandwiched between the two substrates 100 and 101. The periphery of the liquid crystal layer 102 is being sealed with a sealing material 106. These TFT substrate 100, CF substrate 101, and liquid crystal layer 102 constitute a liquid crystal display panel.

The liquid crystal panel includes an image display area 110 for displaying an image and a framing area 111 surrounding the image display area. Pixel electrodes are being formed on the confronting surface of the TFT substrate 100 facing the CF substrate 101 in the image display area 110.

On the non-confronting surfaces of the TFT substrate 100 and CF substrate 101, polarizer plates 103 and 104 are mounted respectively. A back light 105 is disposed facing the polarizer plate 103. The back light 105 radiates illumination light on the liquid crystal display panel from the TFT substrate 100 side.

A frame structure 107 is disposed covering a partial peripheral area of the surface of the framing area 111 and the side edge surface of the liquid crystal display panel 4. The frame structure 107 prevents the illumination light radiated from the back light 105 from leaking outside via the framing area 111.

If the width of the framing area 111 is narrow, the illumination light radiated from the back light 105 and reflected at the side edge surfaces of the TFT substrate 100 and CF substrate 101 may leak outside via a gap 112 between the frame structure 107 and CF substrate 101. Alternatively, light incident upon the liquid crystal panel via the gap 112 and repetitively reflected at the surfaces and side edge surfaces of the TFT substrate 100 and CF substrate 101 may leak outside via the gap 112.

Light leaked outside via the gap 112 lowers the image quality displayed on the peripheral area of the image display area 110. The embodiments of the invention can suppress the image quality from being degraded by light leaked via the gap 112.

The present inventors have proposed to coat the surface of the framing area of one side (e.g., upper side) of the CF substrate 101 with light shielding ink by using a felt tip pen. Coating light shielding ink only at the upper side may be sufficient for the following reason. The side edges of the two substrates are made flush with each other at the upper side, and a florescent lamp as the back light is disposed in parallel with the upper and lower sides of the liquid crystal display panel. Therefore, leak light caused by reflection at the side edges is more likely to occur at the upper side. By coating the surface of the framing area with light shielding ink, leak light from the gap 112 can be reduced and the image quality can be improved.

However, while ink is coated with a felt tip pen, dust such as felt scraps may be attached to the liquid crystal panel, resulting in a degraded image quality. The embodiments to be described hereinafter can coat light shielding ink while generation of dust is suppressed as much as possible.

With reference to FIGS. 1A to 1C, a method of manufacturing a liquid crystal display according to an embodiment will be described.

As shown in FIG. 1A, a liquid crystal panel 4 is constituted by disposing a first substrate 1 and a second substrate 2 to face each other and sandwiching a liquid crystal layer 3 therebetween. TFTs, pixel electrodes and the like are formed on the confronting surface of the second substrate 2 facing the first substrate in an image display area 10. Common electrodes, color filters and the like are formed on the confronting surface of the first substrate 1 facing the second substrate 2. A framing area 11 surrounds the image display area 10 of the liquid crystal panel.

A polarizer plate 6 is disposed on a non-confronting surface of the first substrate 1 opposite to the confronting surface thereof, and another polarizer 7 is disposed on the non-confronting surface of the second substrate 2. The polarizer plates 6 and 7 cover the whole surface of the image display area 10 and a partial inner peripheral area of the surface of the framing area 11.

Fine light shielding ink droplets 21 are supplied from an ink head 20 to the framing area 11 on the non-confronting surface of the first substrate 1. The ink head 20 may be a head of an ink jet printer, a head of a bubble jet printer, a syringe with needles, or the like. If a printer head is used, fine ink droplets are supplied to the framing area 11 by controlling a flying direction of the droplets. If a syringe is used, fine ink droplets are dropped onto the framing area 11.

As shown in FIG. 1B, a light shielding film 8 made of light shielding ink covers a partial area of the non-confronting surface of the first substrate 1 and a nearby area of the side edge of the polarizer 6. A back light 9 is disposed facing the non-confronting surface of the second substrate 2. The back light 9 radiates illumination light toward the liquid crystal panel 4. A frame structure 15 is disposed covering an area from the side edge of the first substrate 1 to the inner upper area of the light shielding film 8. The frame structure 15 is formed with a window in an area corresponding to the image display area 10 of the liquid crystal panel 4.

The frame structure 15 covers a partial outer peripheral area of the framing area 11, and the light shielding film 8 covers a partial area covered with the frame structure and a partial area inside of the partial area first mentioned. Under the condition that the liquid crystal panel 4 is viewed from the first substrate 1 side (from the front of the liquid crystal panel), the frame structure 15 and light shielding film 8 are overlapped and most of the area between the inner border of the frame structure 15 and the border of the image display area 10 are covered with the light shielding film 8. An area between the light shielding film 8 and image display area 10 is shielded with a light shielding metal film or the like formed on the confronting surface of the first or second substrate 1 or 2.

It is necessary to provide a space 12 between the border of the image display area 10 and the inner border of the frame structure 15 to absorb a mount error of the frame structure 15. The light shielding film 8 is formed in this space 12. Since the light shielding film 8 is formed by supplying fine ink droplets, the positional precision of the film 8 can be made high. In other words, a space between the inner border of the light shielding film 8 and a border of the image display area 10 can be made narrower than the space between the inner border of the frame structure 15 and the border of the image display area 10. Accordingly, most of illumination light radiated from the back light 9 and reflected from the side edge surfaces of the liquid crystal panel can be shielded with the light shielding film 8 and are hard to leak outside of the liquid crystal panel 4. It is also possible to prevent external light that enters the liquid crystal panel 4 via the space 12 from reaching the side edge surfaces of the liquid crystal panel 4, so that leak light caused by externally entered light can be reduced.

In order to sufficiently shield leak light, it is preferable to select the material and thickness of the light shielding film 8 so that the light transmission factor of the light shielding film 8 becomes 50% or smaller. If the light shielding film 8 is so thick that it contacts the frame structure 15, it may become easy to be peeled off. It is therefore preferable to set the thickness to 0.5 mm or thinner.

The influence of leak light generated by light reflected at the side edge surfaces of the liquid crystal panel 4 becomes conspicuous in an area more inward than the substrate edge by 5 mm or shorter. It is therefore preferable to form the light shielding film 8 in an area that is more inward than the substrate edge by 5 mm or shorter.

By disposing the light shielding film 8 on the surface of the framing area 11 in the manner described above, leak light from the framing area 11 can be reduced so that the image quality in the outer peripheral area of the image display area 10 can be prevented from being lowered.

The edges of the first and second substrates 1 and 2 are flush with each other at one side of the rectangular liquid crystal panel 4, as viewed along the direction normal to the substrates, as shown in FIG. 18. At least at two sides of the other three sides, the edges of the first substrate are positioned inwardly of the corresponding edges of the second substrate.

FIG. 1C is a cross sectional view of the display device wherein the edge of the first substrate 1 is positioned inwardly of the edge of the second substrate. In this case, the light shielding film 8 covers also the side edge surface of the first substrate 1. A plurality of terminals 16 are formed through tape automated bonding (TAB) techniques on the confronting surface of the second substrate 2 in the area outer than the side edge of the first substrate 1. In order to retain a stable electrical insulation between terminals 16, it is preferable to set the electric resistivity of the light shielding film 8 to $1 \times 10^8 \Omega$ cm or higher.

In this embodiment, the light shielding film 8 is formed by flying or dropping light shielding fine ink droplets. The light shielding film 8 may be formed by other methods such as a method which does not make an ink supply source come in contact with a liquid crystal panel.

Next, an example of an apparatus for forming a light shielding film by supplying light shielding fine ink droplets will be described.

Figure 2:
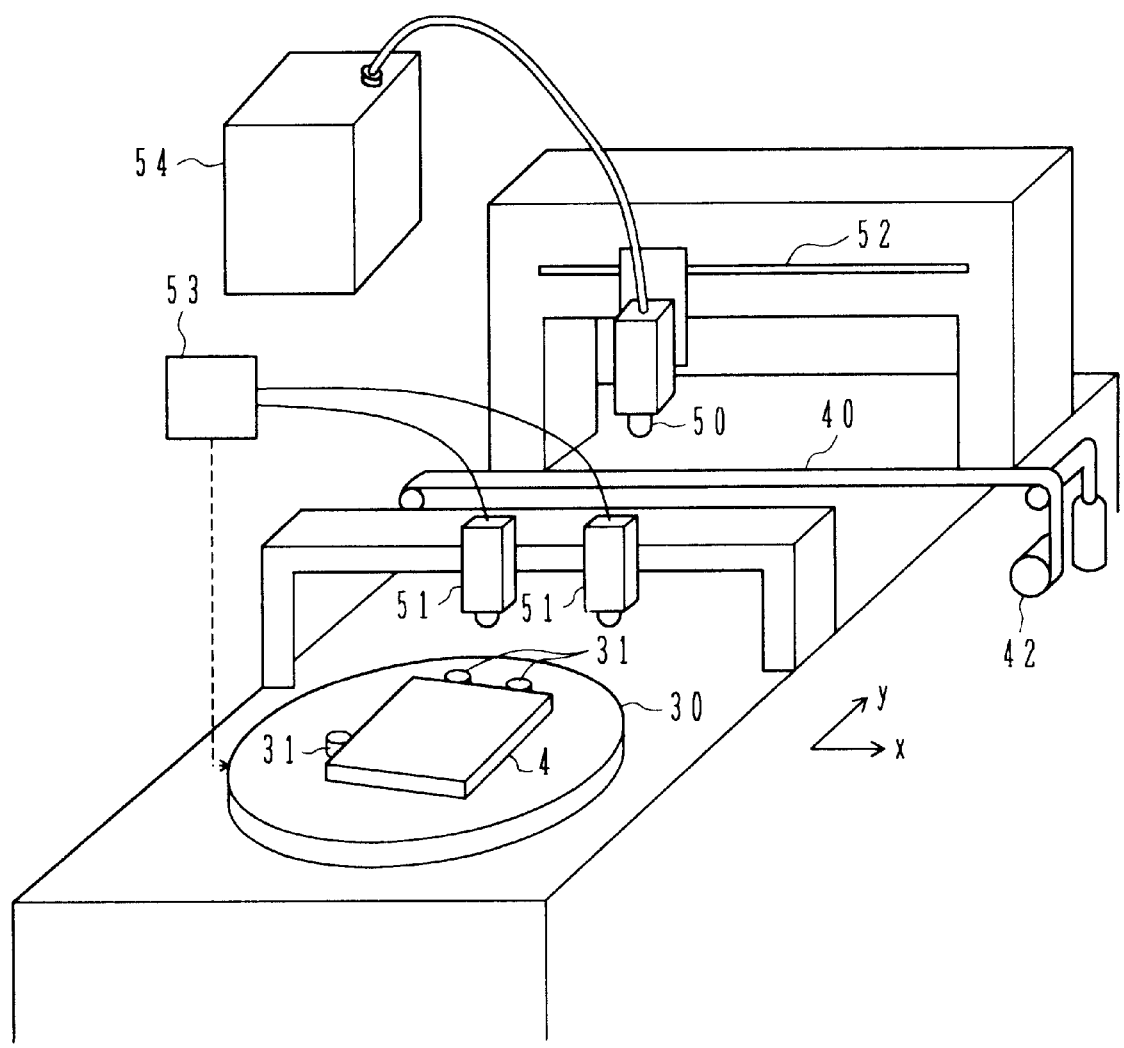
FIG. 2 is a perspective view of an apparatus used for the manufacture of a liquid crystal display according to an embodiment of the invention.

FIG. 2 is a perspective view of an apparatus for manufacturing a liquid crystal device according to an embodiment of the invention. This manufacturing apparatus includes a holding stage 30, a protective tape 40, an ink head 50, CCD cameras 51, and a linear guide 52. Consider an x-y rectangular coordinate system having an x-y plane parallel to the horizontal plane and the x-axis direction being a guide direction of the linear guide 52.

The holding stage 30 horizontally holds a liquid crystal panel 4, and can rotate it along the x-y plane and translate it in the y-axis direction. The liquid crystal panel 4 is set on the holding stage at a correct position while the side edges of the panel are abutted on stoppers 31 mounted on the upper surface of the holding stage 30, and vacuum-sucked to the holding stage 30.

The holding stage 30 is moved along the y-axis direction to the position under the CCD cameras 51. The two CCD cameras 51 are mounted linearly along a line parallel to the x-axis and detect markers formed on the liquid crystal panel 4. The detected results are input to a controller 53. The controller 53 operates to rotate the holding stage 30 so as to make an ink coating area of the liquid crystal panel 4 be parallel to the x-axis.

After the rotary position of the liquid crystal panel 4 is determined, the holding stage 30 is moved along the y-axis to position the liquid crystal panel 4 under the protective tape 40 and ink head 50. The ink head 50 is supported by the linear guide 52 in such a manner that it can translate along the x-axis. Light shielding ink is supplied from an ink tank 54 to the ink head 50. The protective tape 40 is fed from a feeding roll, passes between the liquid crystal panel 4 and ink head 50 along the x-direction, and is wound about a winding roll (not shown).

The ink head 50 is mounted facing the liquid crystal panel 4 disposed under the ink head. The ink head 50 can jet out light shielding fine ink droplets while its flying direction is controlled, and can transport the droplets to a desired surface area of the liquid crystal panel 4. The ink head 50 may be Codebox 3 manufactured by Domino UK LTD., and the light shielding ink may be BK0101 manufactured by Domino UK LTD. Solvent such as dye or pigment ink may be used. Solvent may be ketone such as methylethylketone or alcohol such as isopropyl alcohol, ethyl alcohol and methyl alcohol.

The protective tape 40 is constituted of two polyethylene tapes disposed in parallel, as will be later described with reference to FIG. 3. The protective tape 40 obstructs the traveling path of the fine ink droplets jetted out from the ink head 50 so as to prevent the droplets from entering the image display area or other unnecessary areas.

Next, a method of forming a light shielding film by using the apparatus for manufacturing the liquid crystal display shown in FIG. 2 will be described.

The liquid crystal panel 4 is placed on the holding stage 30 at a correct position by abutting the side edges on the stoppers 31. The liquid crystal panel 4 is then adhered to the surface of the holding stage 30 through vacuum suction. The holding stage 30 is rotated so that one side of the liquid crystal panel 4 is made parallel to the x-axis. The holding stage 30 is moved along the y-axis to position the light shielding film forming area of the liquid crystal panel 4 under the ink head 50. While the ink head 50 is moved along the x-direction, light shielding fine ink droplets are blown to the surface of the liquid crystal panel 4.

The light shielding film can be formed at each of the four sides of the liquid crystal panel 4 by repeating the above operations four times.

Figure 3:
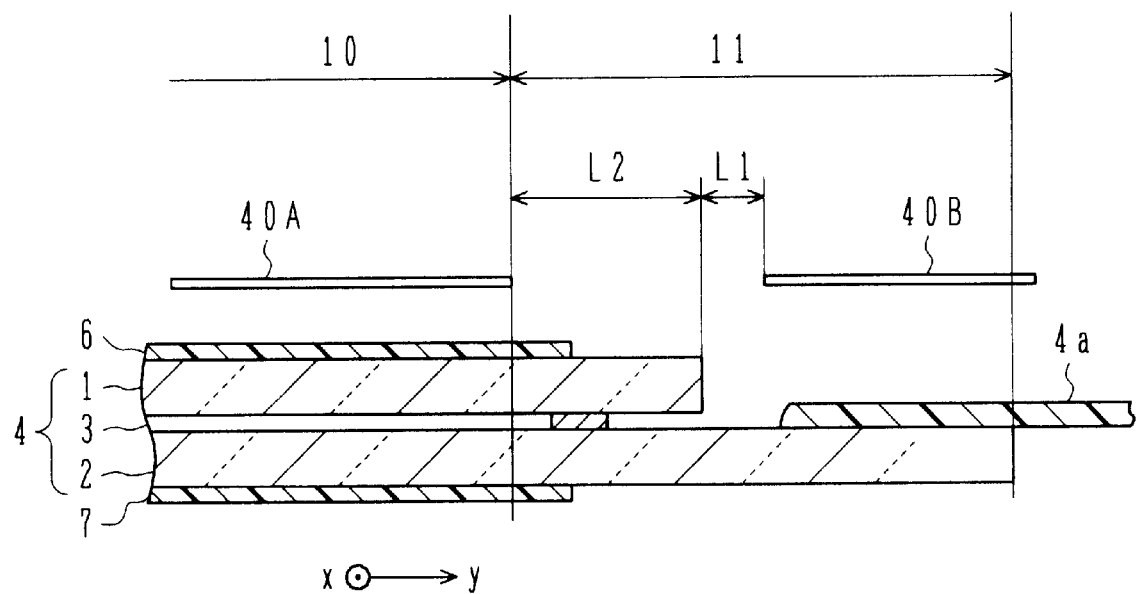
FIG. 3 is a cross sectional view showing a peripheral area of a liquid crystal display in which ink is blown with the manufacturing apparatus shown in FIG. 2.

FIG. 3 is a cross sectional view, perpendicular to the x-axis, of an ink blowing area of the manufacturing apparatus shown in FIG. 2. A liquid crystal panel 4 is constituted of a first substrate 1, a liquid crystal layer 3, and a second substrate 2. Polarizer plates 6 and 7 are adhered to the outer surfaces of the first and second substrates 1 and 2. The first substrate 1 is smaller than the second surface 2 so that the inner surface of the second substrate 2 is exposed in an area outer than the side edge of the first substrate. On this exposed surface, film lead wires 4a are connected through TAB techniques.

A protective tape 40A is provided over the image display area 10 of the liquid crystal panel 4, and a protective tape 40B is provided over an area where the film lead wires 4a are connected. For example, a gap L1 between the side edge of the first substrate 1 and the protective tape 40B is 0.2 to 0.5 mm, and a gap L2 between the side edge of the first substrate 1 and the protective tape 40A is 1.2 to 1.4 mm.

Fine ink droplets flying toward the image display area 10 or the area where the film lead wires 4a are connected are intercepted by the protective tape 40A or 40B and do not reach the surface of the liquid crystal panel 4.

Figure 4A:
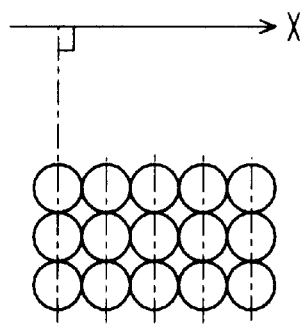
FIGS. 4A to 4C are plan views showing layouts of dots of fine ink droplets blown on the surface of a liquid crystal display panel.
Figure 4B:
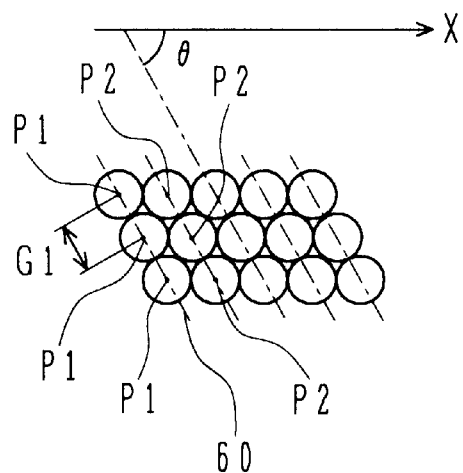
Figure 4C:
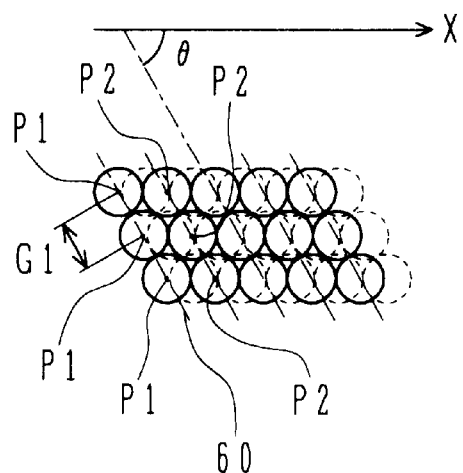

FIGS. 4A to 4C are plan views showing layouts of dots of fine ink droplets blown on the surface of a liquid crystal display panel.

FIG. 4A shows an orthogonal lattice pattern in which each dot is formed on a cross point of the lattice pattern. FIG. 4B shows an oblique lattice pattern in which each dot is formed on a cross point of the lattice pattern. Specifically, dots are disposed in parallel along the x-direction and along a virtual straight line 60 intersecting the x-axis at an angle θ. The pattern shown in FIG. 4A corresponds to the angle θ of 90°.

If adjacent ink dots are disposed in contact with each other, a coverage of the substrate surface with the ink dots shown in FIG. 4A is 78.5%, whereas a coverage with the ink dots at the angle θ of 60° shown in FIG. 4B is 90.6%. The largest coverage is achieved at the angle θ of 60°. By setting the angle θ to 50 to 70°, it is expected that leak light can be efficiently shielded.

An example of a method of forming the ink dot pattern shown in FIG. 4B will be described.

Fine ink droplets are supplied to a plurality of coating target points P1 disposed at a pitch G1 on the virtual straight line 60 intersecting the x-axis at the angle of 60°. Next, fine ink droplets are supplied to a plurality of coating target points P2 which are spaced apart by the pitch G1 or shorter from the coating target points P1 along the x-axis direction. By repeating the position displacement of fine ink droplet supply points along the x-axis direction and the supply of fink ink droplets, the dot pattern shown in FIG. 4B can be formed.

FIG. 4C illustrates a method of coating ink droplets at the second time by shifting along the x-axis direction the coating target points where fine ink droplets were supplied at the process illustrated in FIG. 4B. Circles indicated by solid lines in FIG. 4C show the ink dot pattern formed by the process illustrated in FIG. 4B, and circles indicated by broken lines show an ink dot pattern formed by the second ink coating process.

The coating target points where fine ink droplets are supplied at the second ink coating process are positioned in spaces between the coating target points where fine ink droplets were supplied at the first ink coating process. By performing the second ink coating process by shifting the coating target points, it becomes possible to increase the surface coverage of ink dots.

In this embodiment, the light shielding film 8 is formed after the polarizer plate 6 is adhered at the process illustrated in FIG. 1A. Instead, the light shielding film 8 may be formed before the polarizer plate 6 is adhered. In this case, since no step is present on the surface of the liquid crystal panel when fine ink droplets are blown, diffusion of ink particles can be suppressed so that the light shielding film 8 having a uniform thickness can be formed. However since the polarizer plate 6 is adhered via the light shielding film 8 to the substrate, the polarizer plate 6 becomes easy to be dismounted.

Also in this embodiment, the light shielding film 8 is formed on the front surface of the liquid crystal panel 4 as shown in FIGS. 1B and 1C. If leak light to be caused by external incidence light does not pose a practical problem, the light shielding film 8 may be formed on the rear surface (on the back light 9 side) of the liquid crystal panel 4.

Next, with reference to FIGS. 5A and 5B, an ink coating apparatus according to another embodiment will be described.

Figure 5A:
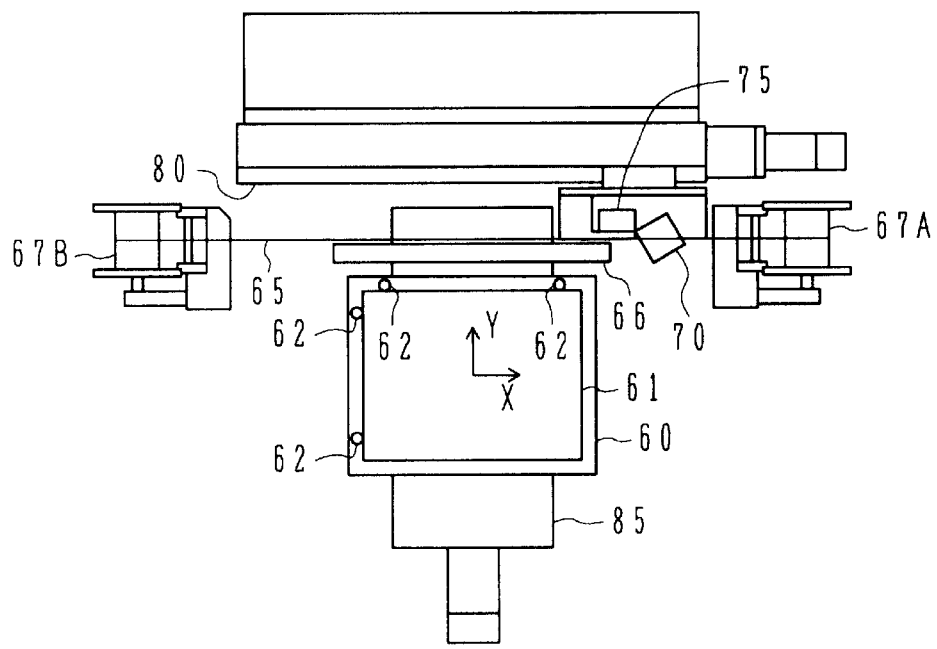
FIGS. 5A and 5B are a plan view and front view of an ink coating apparatus according to an embodiment of the invention.
Figure 5B:
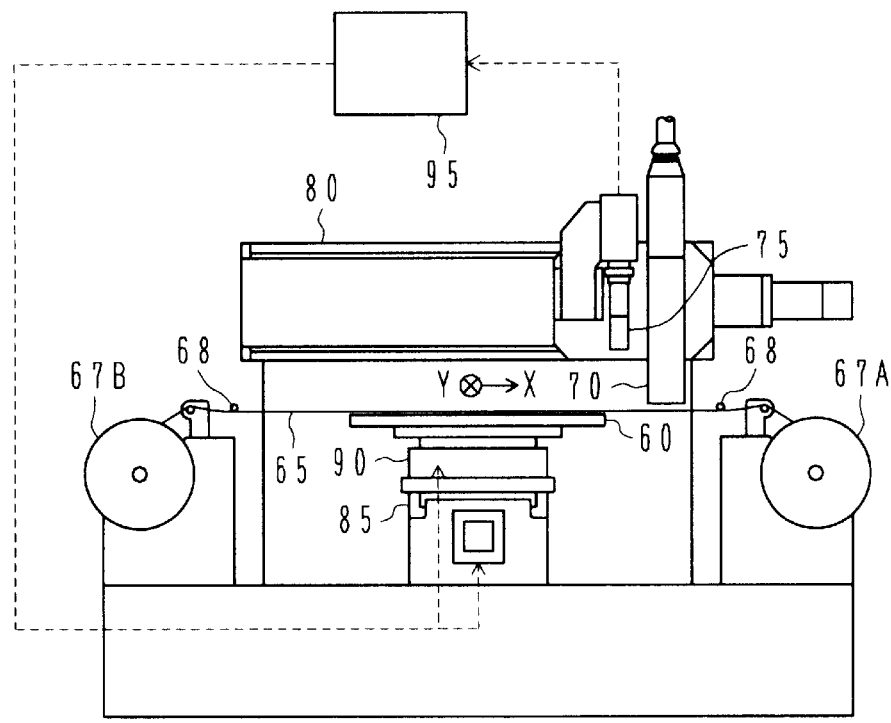

FIGS. 5A and 5B are a plan view and a front view of the ink coating apparatus of this embodiment. This ink coating apparatus is constituted of a holding stage 60, a protective wire 65, a shielding plate 66, an ink head 70, a CCD camera 75, a guide mechanism 80, a translation mechanism 85, a rotation mechanism 90, and a controller 95.

The holding stage 60 horizontally holds a liquid crystal panel 61. An x-y rectangular coordinate system is defined in the horizontal plane. The liquid crystal panel 61 is set on the holding stage 60 at a correct position in the x-y plane while the side edges of the panel are abutted on projections 31 formed on the upper surface of the holding stage 60, and vacuum-sucked to the holding stage 60.

The rotation mechanism 90 rotates the holding stage 60 in the x-y plane. The translation mechanism 85 translates the holding stage 60 along the y-axis direction. The ink head 70 and CCD camera 75 are mounted on the guide mechanism 80 to be movable along the x-axis direction. While the ink head 70 and CCD camera 75 are moved along the x-axis direction, they pass over the liquid crystal panel 61 held by the holding stage 60. At least two alignment marks are formed on the liquid crystal panel 61. As the CCD camera 75 passes over the liquid crystal panel 61, it detects the alignment marks. The detection results are supplied to the controller 95.

The controller 95 drives the translation mechanism 85 and rotation mechanism 90 to set the liquid crystal panel at a predetermined position. While the ink head 70 passes over the liquid crystal panel 61, it supplies fine ink droplets to the surface of the liquid crystal panel 61. The ink head 70 has a nozzle for ejecting fine ink droplets. The ink head 70 may be Codebox 3 manufactured by Domino UK LTD., and the light shielding ink may be BK0101 manufactured by the same company.

An area near the ink coating area of the liquid crystal panel 61 is covered with the protective wire 65 and shielding plate 66. Rolls 67A and 67B are disposed at opposite ends of the protective wire 65 extending over the liquid crystal panel 61. One roll 67A feeds the protective wire 65 and the other roll 65 wounds it. Slightly inside of the rolls 67A and 67B, pins 68 are mounted. The pins 68 push down the protective wire 65. By changing the height of the pin 68, the height of the protective wire 61 from the surface of the liquid crystal panel 61 can be adjusted. The protective wire 65 may be a fishing gut of 0.5 mm in diameter. The shielding plate 66 may be a plate made of resin or metal having a thickness of about 0.5 to 1 mm.

The shielding plate 66 is fixed at some height from the surface of the liquid crystal panel 61.

Figure 6:
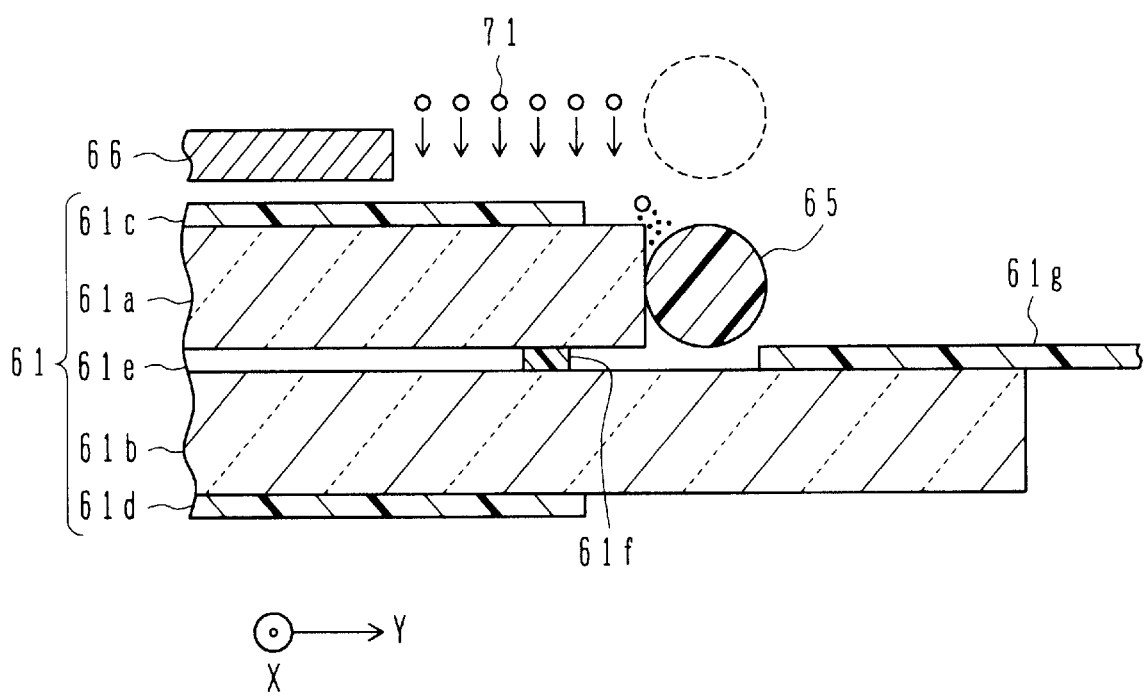
FIG. 6 is a cross sectional view showing a peripheral area of a liquid crystal display in which ink is blown with the ink coating apparatus shown in FIGS. 5A and 5B.

FIG. 6 is a cross sectional view showing an ink coating area during the ink coating process. A liquid crystal panel 61 is constituted of a first substrate 61a and a second substrate 61b disposed in parallel and spaced by a certain gap. As viewed along a direction normal to the substrate surface, the side edge of the first substrate 61a is inside of the side edge of the second substrate 61b. Of the four sides of the liquid crystal panel, at one side, for example, the side edges of the two substrates 61a and 61b are flush with each other as viewed along the substrate surface normal direction.

A first polarizer plate 61c is adhered to the outer surface of the first substrate 61a, and a second polarizer plate 61d is adhered to the outer surface of the second substrate 61b. Liquid crystal material 61e is filled in between the two substrates 61a and 61b. The liquid crystal material 61e is hermetically sealed with a sealing member 61f.

Film lead wires 61g are connected to the confronting surface of the second substrate 61b facing the first substrate in an area outer than the side edge of the first substrate 61a. The film lead wire 61g may be connected through TAB techniques.

The shielding plate 66 covers an area adjacent to the inner periphery of the ink coating area on and over the first substrate 61a. A protective wire 65 is disposed on or slightly apart from the side edge of the first substrate 61a. The protective wire 65 is maintained above the liquid crystal panel 61 as indicated by a broken line in FIG. 6 until the ink coating area is set to the predetermined position. After the protective wire 65 is lowered and disposed on or slightly apart from the side edge of the first substrate 61a, fine ink droplets 71 are blown toward the ink coating area over the first substrate 61a.

Fine ink droplets shifted from a desired flying path and travelling to the inner area of the first substrate 61a are intercepted by the shielding plate 66 and will not reach the inner area. Fine ink droplets colliding with a step of the liquid crystal panel 61 are broken and dispersed toward the peripheral area. These dispersed ink droplets are intercepted by the protective wire 65 and prevented from attaching the area of the film lead wires 61g. By covering the peripheral area of the ink coating area of the liquid crystal panel 61 with the protective wire 65 and shielding plate 66, ink can be prevented from being coated on the peripheral area of the ink coating area.

Next, a method of coating ink in the framing area of the liquid crystal panel 61 by using the ink coating apparatus shown in FIGS. 5A, 5B, and 6 will be described.

The liquid crystal panel 61 is placed on the holding stage 60 at a correct position by abutting the side edges on the protrusions 62. The liquid crystal panel 61 is then adhered to the surface of the holding stage 60 through vacuum suction. The holding stage 60 is rotated so that one side of the liquid crystal panel 61 is made parallel to the x-axis. The holding stage 60 is moved along the y-axis to position the ink coating area of the liquid crystal panel 61 under the ink head 70. While the CCD camera 75 is moved along the x-direction, the alignment marks of the liquid crystal panel 61 are detected. The position and direction of the holding stage 60 are minutely adjusted so that the ink coating area is located at a predetermined position.

The protective wire 65 is lowered near to the side edge of the first substrate 61a of the liquid crystal panel 61. While the ink head 70 is moved along the x-axis, fine ink droplets are blown and coated on the ink coating area of the liquid crystal panel 61.

The above ink coating process is performed for each side of the liquid crystal panel to coat the four side framing areas with ink. In this manner, a light shielding film can be formed on the framing areas of the liquid crystal panel.

In this embodiment, light shielding ink is coated on the surface of the framing areas of the liquid crystal panel. Next, with reference to FIGS. 7A and 7B, an embodiment of forming a light shielding film on the side edges of a liquid crystal panel will be described.

Figure 7A:
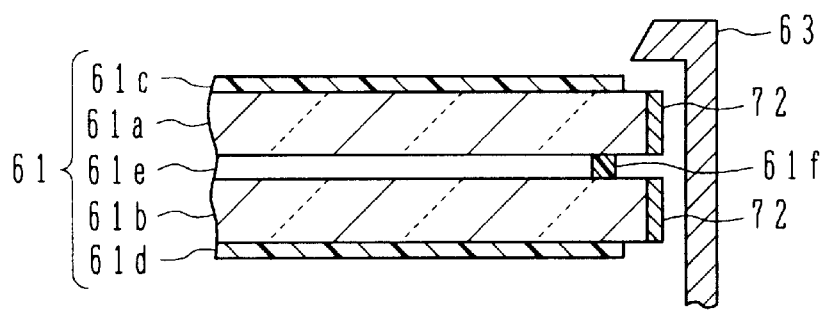
FIG. 7A is a cross sectional view of a liquid crystal panel according to another embodiment of the invention.

As shown in FIG. 7A, a liquid crystal panel 61 is constituted of first and second substrates 61a and 61b, first and second polarizer plates 61c and 61d, liquid crystal material 61e, and a sealing member 61f. Light shielding films 72 are formed on the side edge surfaces of the first and second substrates 61a and 61b. A frame structure 63 is mounted covering a partial outer framing area and side edge surfaces of the liquid crystal panel 61. The light shielding film 72 may be formed by jetting out light shielding ink while a tip of an injection syringe is moved along the side edges of the liquid crystal panel 61.

If stray light exists in a gap between the frame structure 63 and liquid crystal panel 61, this stray light can be prevented from transmitting through the side edge surfaces of the liquid crystal panel 61 and leaking from the front surface thereof. Instead of forming the light shielding film 72 on the side edge surfaces of the liquid crystal panel 61, the side edge surfaces may be matt finished.

Figure 7B:
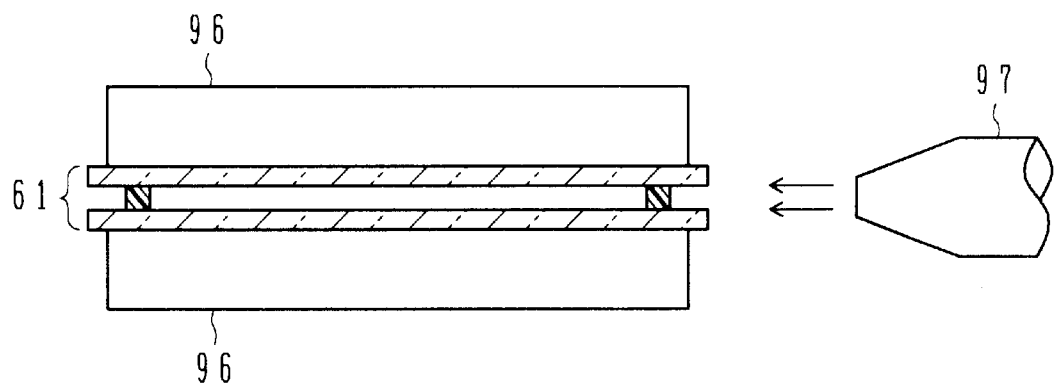
FIG. 7B is a diagram illustrating a matt finishing method.

FIG. 7B illustrates a matt finishing process for the side edge surface of a liquid crystal panel 61. First, the surface of the liquid crystal panel 61 is protected with protective cover plates 96 in tight contact with the front and back surfaces of the liquid crystal panel 61. High pressure gas containing ceramic abrading particles are blown from a nozzle 97 toward the side edge surfaces of the liquid crystal panel 61. The abrading particles abrade the side edge surface of the liquid crystal panel to work them to have matt finished surfaces. Matt finished surfaces may be formed through rapping, chemical etching or the like.

An image quality to be lowered by leak light transmitted through the side edge surface is likely to occur in an area where the side edges of the two substrates are flush with each other as shown in FIG. 1B. The influence of leak light is less in an area where the side edges of the two substrates are displaced as shown in FIG. 1C. This is because a substantial area of side edge surfaces is larger in the area where the side edges of the two substrates are flush with each other. From this reason, it can be expected that leak light can be more effectively reduced if the light shielding film or a matt finished surface is formed on the side edge surface in the area where the side edges of the two substrates are flush with each other.

Also as shown in FIGS. 1A to 1C, it can be expected that leak light can be more effectively reduced if the light shielding film is formed on the surface of the framing area corresponding to the area where the side edges of the two substrates are flush with each other. If the image quality is not lowered or less lowered in the area where the side edges of the two substrates are not flush, the light shielding film may not be formed. In this case, the number of manufacture processes can be reduced.

In the above embodiments, preventing an image quality in an area near the framing area from being lowered has been described by taking liquid crystal panels as examples. These embodiments may also be applied to other image display devices having transparent substrates, such as plasma display panels (PDP). The ink coating apparatus shown in FIG. 5 may be used not only for an image display device, but also to other display devices. The effect of a protective wire is particularly useful when ink is coated on a surface having a step.

The present invention has been described in connection with the preferred embodiments. The invention is not limited only to the above embodiments. It is apparent that various modifications, improvements, combinations, and the like can be made by those skilled in the art.

What is claimed is:

1. A method of manufacturing an image display device, comprising the steps of:

preparing an image display panel having in an in-plane thereof an image display area for displaying an image and a framing area surrounding the image display area; and supplying light shielding ink from an ink supply source to at least a partial surface area of the framing area of the image display panel, the light shielding ink being coated on the partial surface area without bringing the ink supply source into contact with the image display panel.

2. A method of manufacturing an image display device, according to claim 1, wherein the image display panel has a step on a surface of the framing area, and in said step of coating the light shielding ink, the light shielding ink is coated so as to overlap the step.

3. A method of manufacturing an image display device, according to claim 1, wherein said step of coating the light shielding ink comprises the steps of:

blowing light shielding ink droplets from said ink supply source while moving said ink supply source relative to the image display panel; and supplying said light shielding ink droplets to at least the partial framing area of the image display panel.

4. A method of manufacturing an image display device, according to claim 1, wherein said step of coating the light shielding ink comprises the step of:

dropping light shielding ink droplets down onto at least the partial framing area of the image display panel.

5. A method of manufacturing an image display device, according to claim 3, wherein said step of coating the light shielding ink comprises:

a first step of supplying light shielding ink droplets to each of a plurality of coating target points disposed along a virtual straight line parallel to a first direction on a surface of the image display panel; and a second step of supplying light shielding ink droplets to each of a plurality of coating target points obtained by displacing the plurality of coating target points disposed along the virtual straight line in a second direction obliquely intersecting the first direction.

6. A method of manufacturing an image display device, according to claim 5, further comprising a third step of:

after said second step, supplying light shielding ink droplets to each of a plurality of coating target points obtained by shifting the plurality of coating target points disposed along the first direction in the second direction, each of the plurality of coating target points obtained being positioned in a place between the coating target points along the second direction supplied with the light shielding ink droplets at said second step.

7. A method of manufacturing an image display device, according to claim 3, wherein said step of coating the light shielding ink includes a step of masking with a shielding member an area adjacent to an area where the light shielding ink droplets are coated.

8. A method of manufacturing an image display device, according to claim 1, wherein:

the image display panel includes a first substrate and a second substrate disposed in parallel to each other and spaced from each other, a side edge of the first substrate is flush with a side edge of the second substrate, and another side edge of the first substrate is inside of another side edge of the second substrate; and said step of coating the light shielding ink coats the light shielding ink on a surface of the framing area located at the flush side edges of the first and second substrates.

9. A method of manufacturing an image display device that includes a first substrate positioned above a second substrate, said method comprising the steps of:

preparing an image display panel having in an in-plane thereof an image display area for displaying an image and a framing area surrounding the image display area, wherein the image display panel has a step near at least two peripheral edges of the framing area, where each of said steps is defined by an edge of said first substrate that terminates inwardly of the associated edge of said second substrate; and supplying light shielding ink from an ink supply source to at least a partial surface area of the framing area of the image display panel, the light shielding ink being coated on the partial surface area without bringing the ink supply source into contact with the image display panel, wherein the light shielding ink is coated to overlap at least one of said steps such that the light shielding ink at said step overlaps a portion of an upper surface of the first substrate, a portion of a peripheral side edge of the first substrate and a portion of an upper surface of the second substrate.

10. A method of manufacturing an image display device, according to claim 9, wherein the first substrate and the second substrate are disposed in parallel to each other and are spaced from each other, at least one peripheral side edge of the first substrate is flush with a peripheral side edge of the second substrate, wherein:

said step of coating the light shielding ink coats the light shielding ink on the flush peripheral side edges of the first and second substrates.

11. A method of manufacturing an image display device, according to claim 9, wherein said step of coating the light shielding ink includes a step of masking with a shielding member an area adjacent to an area where the light shielding ink droplets are coated such that the shielding member prevents the light shielding ink droplets from coating a particular portion of the image display panel.

12. A method of manufacturing an image display device, according to claim 9, wherein the image displaying device further includes film lead wires positioned upon said first substrate, the method of manufacturing further comprising the step of:

providing a protective wire in a space near at least one of said steps during said step of supplying light shielding ink, wherein said protective wire intercepts said light shielding ink droplets from attaching to an area of the film lead wires.

13. A method of manufacturing an image display device, according to claim 12, further comprising the step of:

lowering the protective wire to a position adjacent to one of the peripheral side edges of the first substrate.

14. A method of manufacturing an image display device, according to claim 9, wherein the first substrate and the second substrate are disposed in parallel to each other and are spaced from each other, at least one peripheral side edge of the first substrate is flush with a peripheral side edge of the second substrate, the method further comprising the step of:

creating a matt finish on the flush peripheral side edges of the first and second substrates.

15. A method of manufacturing an image display device comprising the steps of:

preparing an image display panel having in an in-plane thereof an image display area for displaying an image and a framing area surrounding the image display area; and supplying light shielding ink from an ink supply source to at least a partial surface area of the framing area of the image display panel, the light shielding ink being coated on the partial surface area without bringing the ink supply source into contact with the image display panel;

wherein the supplying step includes blowing light shielding ink droplets from said ink supply source while moving said ink supply source relative to the image display panel, and further wherein the supplying step also includes:

a first step of supplying a light shielding ink droplet to each of a plurality of coating target points disposed along a virtual straight line parallel to a first direction on a surface of the image display panel; and a second step of moving the ink supply source relative to the image display device to supply a light shielding ink droplet to each of a plurality of coating target points obtained by displacing the plurality of coating target points disposed along the virtual straight line in a second direction that obliquely intersects the first direction.

16. A method of manufacturing an image display device, according to claim 15, further comprising a third step of:

after said second step, supplying a light shielding ink droplet to each of a plurality of coating target points obtained by shifting the plurality of coating target points in the second direction, such that each of the newly obtained plurality of coating target points are positioned to overlap at least two of the previously obtained coating target points that are adjacent to each other along the second direction.

17. A method of manufacturing an image display device, according to claim 15, wherein said step of coating the light shielding ink includes a step of masking with a shielding member an area adjacent to an area where the light shielding ink droplets are coated such that the shielding member prevents the light shielding ink droplets from coating a particular portion of the image display panel.

18. A method of manufacturing an image display device, according to claim 15, wherein:

the image display panel includes a first substrate and a second substrate disposed in parallel to each other and spaced from each other, at least one peripheral side edge of the first substrate is flush with a peripheral side edge of the second substrate; and said step of coating the light shielding ink coats the light shielding ink on the flush peripheral side edges of the first and second substrates.

19. A method of manufacturing an image display device, according to claim 15, wherein an angle of approximately 60° is formed between said first direction and said second direction.

20. A method of manufacturing an image display device according to claim 15, wherein during said first step, said light shielding ink droplets are simultaneously supplied to at least two of said coating target points that are adjacent to each other and are disposed along said virtual straight line parallel to said first direction on said surface of the image display panel.

* * * * *